US012784576B2

(12) United States Patent
Yamada et al.

(10) Patent No.: US 12,784,576 B2
(45) Date of Patent: Nov. 3, 2026

(54) COMMUNICATION SYSTEM

(71) Applicant: DENSO CORPORATION, Kariya-city (JP)

(72) Inventors: Tsuyoshi Yamada, Kariya-city (JP); Takehiro Nagato, Kariya-city (JP); Masaya Taki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 317 days.

(21) Appl. No.: 18/429,210

(22) Filed: Jan. 31, 2024

(65) Prior Publication Data

US 2024/0169825 A1 May 23, 2024

Related U.S. Application Data

(63) Continuation of application No. PCT/JP2022/029731, filed on Aug. 3, 2022.

(30) Foreign Application Priority Data

Aug. 4, 2021 (JP) ................................ 2021-128131

(51) Int. Cl.
*G08C 15/02* (2006.01)
*B62D 5/04* (2006.01)
*B62D 6/10* (2006.01)

(52) U.S. Cl.
CPC ............... *G08C 15/02* (2013.01); *B62D 5/04* (2013.01); *B62D 6/10* (2013.01)

(58) Field of Classification Search
CPC ...................................................... G06N 3/088
See application file for complete search history.

(56) References Cited

U.S. PATENT DOCUMENTS

2001/0044688 A1* 11/2001 Okita .................. B60W 50/029 701/76
2009/0082638 A1* 3/2009 Hirao ........................ A61B 5/07 600/300
2014/0352396 A1* 12/2014 Rauh .................. G01D 5/24461 73/1.01

(Continued)

FOREIGN PATENT DOCUMENTS

JP 2018106513 A 7/2018
JP 6468394 B2 * 2/2019 ............... G01D 5/12
JP 2019101528 A 6/2019

*Primary Examiner* — Wutchung Chu
*Assistant Examiner* — Berhanu D Belete
(74) *Attorney, Agent, or Firm* — Precision Patents, P.C.

(57) ABSTRACT

A reception unit of a microcomputer includes a plurality of signal acquisition units and one transmission trigger signal generation unit. Each of the signal acquisition units is connected to a respective sensor element of a sensor device corresponding thereto via a corresponding communication channel, and, when the communication channels are in a transmittable state, sensor values transmitted via the communication channels are acquired. One transmission trigger signal generation unit generates a transmission trigger signal for simultaneously putting the plural communication channels in the transmittable state. The plurality of signal acquisition units in the reception unit simultaneously acquire the plurality of sensor values using a common transmission trigger signal.

8 Claims, 12 Drawing Sheets

(56) References Cited

U.S. PATENT DOCUMENTS

| | | | | |
|---|---|---|---|---|
| 2016/0041014 | A1* | 2/2016 | Sameshima | G01D 21/00 702/127 |
| 2016/0339946 | A1* | 11/2016 | Kuramitsu | B62D 5/0421 |
| 2016/0339948 | A1* | 11/2016 | Nakamura | G01R 33/04 |
| 2016/0362129 | A1* | 12/2016 | Taki | H04Q 9/04 |
| 2017/0029016 | A1* | 2/2017 | Kozawa | G01L 25/00 |
| 2017/0050670 | A1* | 2/2017 | Kuramitsu | G01L 25/003 |
| 2018/0086368 | A1 | 3/2018 | Patel et al. | |
| 2019/0039643 | A1* | 2/2019 | Oka | B62D 6/10 |
| 2021/0013981 | A1* | 1/2021 | Ueda | H04L 67/12 |

* cited by examiner

1ST SENSOR DEVICE

2ND SENSOR DEVICE

COMMUNICATION SYSTEM

CROSS REFERENCE TO RELATED APPLICATIONS

This application is a continuation application of International Patent Application No. PCT/JP2022/029731 filed on Aug. 3, 2022, which designated the U.S. and claims the benefit of priority from Japanese Patent Application No. 2021-128131 filed on Aug. 4, 2021. The entire disclosure of all of the above application is incorporated herein by reference.

TECHNICAL FIELD

The present disclosure relates to communication systems.

BACKGROUND

Conventionally, communication systems are known in which a microcomputer receives sensor values redundantly detected by a plurality of sensors and performs control calculations based on the plurality of sensor values. For example, in a communication system applied to an electric power steering device, a microcomputer calculates a torque value from a plurality of sensor values transmitted from a torque sensor, and calculates an assist amount based on the torque value. In such a communication system, if the simultaneity of/among respective sensor values is not maintained, there is a risk that the microcomputer may calculate an incorrect torque or erroneously detect an abnormality in the sensor value.

For example, in a typical device, two microcomputers each generate a trigger signal requesting transmission of a sensor value. However, the timing of the trigger signal may be shifted from each other among the two computers due to a shift in the calculation timing of each microcomputer, and sensor values at different timings may be obtained. Therefore, in this detection device, one microcomputer monitors the trigger signal of the other microcomputer, and adjusts the transmission timing of its own trigger signal so that the transmission timing of the trigger signal of the two microcomputers matches.

SUMMARY

In one aspect of the present disclosure, a communication system includes: one or more sensor devices including a plurality of sensor elements each of which detects a sensor value of a physical quantity regarding a same detection target; and one or more microcomputers including: one or more reception units each of which is disposed corresponding to a respective one of the one or more sensor devices, each of the one or more reception units being configured to receive a signal including the sensor value transmitted from a corresponding one of the plurality of sensor elements of the one or more sensor devices; a physical quantity computing unit that is configured to calculate the physical quantity based on the sensor values; and a control amount computing unit that is configured to calculate a predetermined control amount based on the calculated physical quantity. Each of the one or more reception units includes: a plurality of signal acquisition units each of which is connected to a respective one of the sensor elements of the sensor devices via a respective one of a plurality of communication channels, each of the signal acquisition units being configured to acquire the sensor value transmitted via the corresponding communication channel when the corresponding communication channel is in a transmittable state; and one transmission trigger signal generation unit that is configured to generate a common transmission trigger signal for simultaneously putting the communication channels in the transmittable state. The plurality of signal acquisition units in each of the one or more reception units are configured to simultaneously acquire the sensor values by the common transmission trigger signal.

BRIEF DESCRIPTION OF THE DRAWINGS

The features and advantages of the present disclosure will become more apparent from the following detailed description taken in conjunction with the accompanying drawings, wherein.

DETAILED DESCRIPTION

Figure 1:
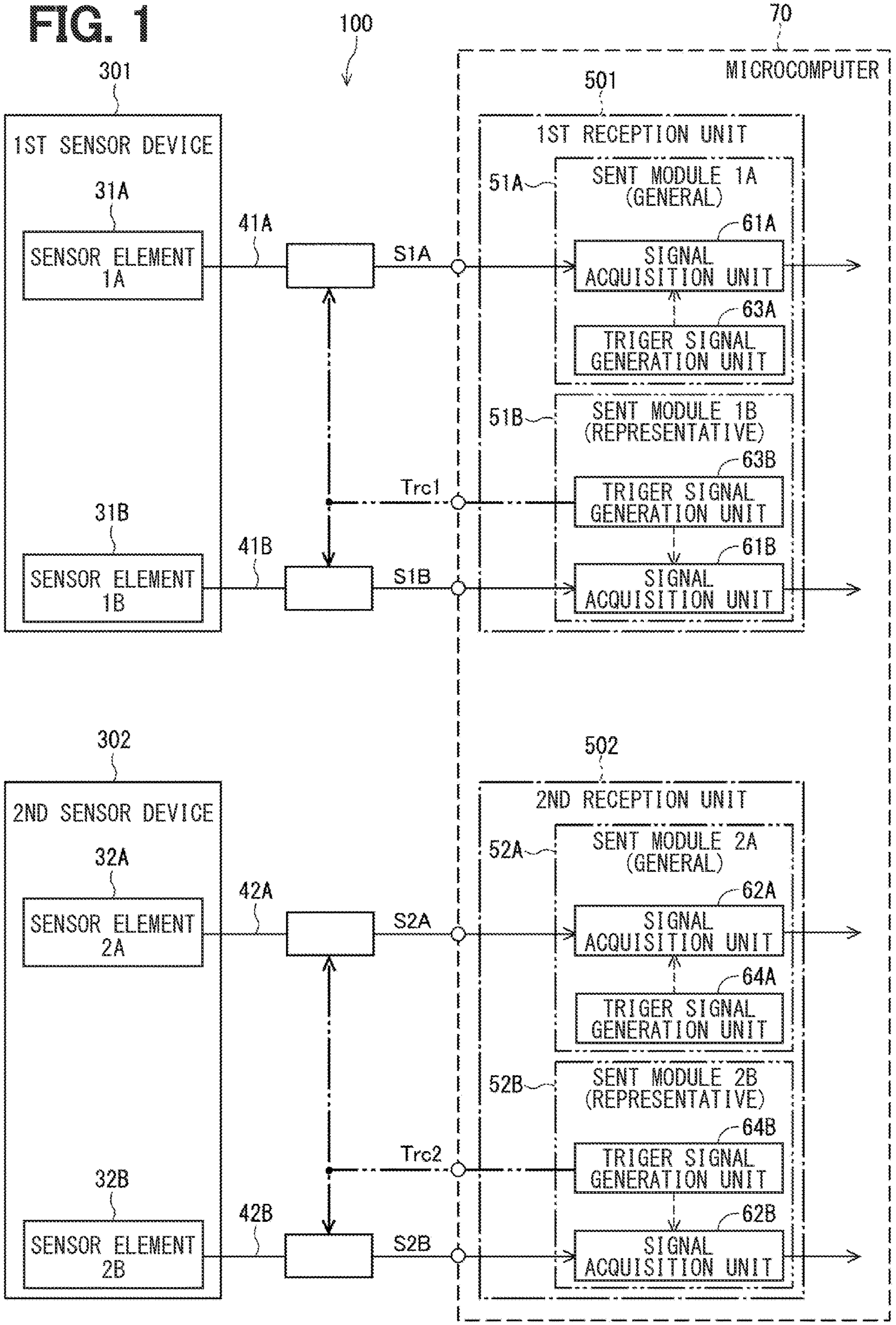
FIG. 1 is a schematic block diagram of a communication system according to a first embodiment.

To begin with, a relevant technology will be described first only for understanding the following embodiments.

In a typical communication system, extra computing power is required because the transmission timing of trigger signals is adjusted between microcomputers. Further, it is assumed a configuration in which a plurality of communication modules corresponding to a plurality of sensor values transmitted from a torque sensor are provided in one microcomputer, for example. In such configuration, when the trigger signal generation unit of each of the plurality of communication modules outputs the trigger signal individually to a corresponding communication channel through which a sensor value of a sensor device is transmitted, there is a problem that the number of the signal output terminals of the microcomputer and the number of wiring steps increase.

It is one objective of the present disclosure to provide a communication system that ensures simultaneity of a plurality of sensor values transmitted via a plurality of communication channels with a simple configuration.

According to an aspect of the present disclosure, a communication system includes: one or more sensor devices including a plurality of sensor elements each of which detects a sensor value of a physical quantity regarding a same detection target; and one or more microcomputers including: one or more reception units each of which is disposed corresponding to a respective one of the one or more sensor devices, each of the one or more reception units being configured to receive a signal including the sensor value transmitted from a corresponding one of the plurality of sensor elements of the one or more sensor devices; a physical quantity computing unit that is configured to calculate the physical quantity based on the sensor values; and a control amount computing unit that is configured to calculate a predetermined control amount based on the calculated physical quantity. Each of the one or more reception units includes: a plurality of signal acquisition units each of which is connected to a respective one of the sensor elements of the sensor devices via a respective one of a plurality of communication channels, each of the signal acquisition units being configured to acquire the sensor value transmitted via the corresponding communication channel when the corresponding communication channel is in a transmittable state; and one transmission trigger signal generation unit that is configured to generate a common transmission trigger signal for simultaneously putting the communication channels in the transmittable state. The plurality of signal acquisition units in each of the one or more reception units are configured to simultaneously acquire the sensor values by the common transmission trigger signal.

Thereby, it is possible to ensure the simultaneity of or among the plurality of sensor values that are acquired by the microcomputer from the sensor devices. Therefore, the microcomputer is prevented from (a) calculating an incorrect physical quantity based on sensor values acquired at different timings or (b) erroneously detecting an abnormality in the sensor value. Further, since one transmission trigger signal is output for each reception unit, the number of signal output terminals and the number of wiring steps of the microcomputer is reducible, thereby the configuration is made simpler.

Next, a plurality of embodiments of a communication system will be described based on the drawings. Substantially the same configurations in the first and second embodiments are given the same reference numerals and descriptions thereof will be omitted. The following first and second embodiments are collectively referred to as "the present embodiment." The communication system of the present embodiment is applied to an electric power steering device, and calculates an assist amount based on a driver's steering torque detected by a sensor device.

First Embodiment

A communication system 100 according to the first embodiment will be described with reference to FIGS. 1 to 8. First, the system configuration will be described with reference to FIGS. 1 and 2. The communication system 100 of the first embodiment includes two sensor devices 301 and 302 provided redundantly and one microcomputer 70. Hereinafter, a unit of configuration elements corresponding to one sensor device will be referred to as a "system." The communication system of the present embodiment has a two-system configuration. FIG. 1 mainly shows the communication configuration between the sensor devices 301 and 302 and the microcomputer 70, and FIG. 2 mainly shows the configuration of the microcomputer 70.

The sensor device 301 of the first system will be referred to as a "first sensor device 301," and the sensor device 302 of the second system will be referred to as a "second sensor device 302." Further, in the microcomputer 70, the configuration element corresponding to the first sensor device 301 is marked with "first," and the configuration element corresponding to the second sensor device 302 is marked with "second" to distinguish them. Since the configurations of the first system and the second system are the same, the first system will be mainly described, and the description of the second system will be omitted as appropriate. The omitted portions for the second system are interpreted by replacing the numeral "1" in the description of the first system with "2."

The first sensor device 301 includes a plurality of sensor elements 31A and 31B that detect a sensor value regarding a driver's steering torque as a "certain physical quantity" from the same detection target. In the present embodiment, the first sensor device 301 includes two sensor elements 31A and 31B. In FIG. 1, the sensor element indicated by a reference numeral 31A is referred to as "sensor element 1A," and the sensor element indicated by a reference numeral 31B is referred to as "sensor element 1B." Moreover, the sensor values of the steering torque detected by the sensor elements 31A and 31B are respectively written as S1A and S1B.

For example, when Hall elements that are magnetic detection elements are used as the sensor elements 31A and 31B, a Hall IC that is a package including the Hall elements corresponds to the sensor device 301. The sensor elements 31A and 31B detect the magnetic displacement of the magnetic flux collecting ring based on the torsion angle of the torsion bar in a steering torque sensor 93 shown in FIG. 3, convert it into a voltage signal, and output it. In this example, the magnetic flux collecting ring corresponds to a "detection target." Note that magnetic detection elements other than Hall elements or elements that detect changes other than magnetism may also be used as the sensor elements 31A and 31B.

The sensor device 301 of the present embodiment transmits a sensor signal including information on sensor values S1A and S1B detected by the sensor elements 31A and 31B as a digital signal via communication channels 41A and 41B at a constant transmission cycle. Specifically, as the sensor signal, a nibble signal conforming to the American Society of Automotive Engineers standard SAE-J2716, a so-called SENT (Single Edge Nibble Transmission) signal, is used. The sensor device 301 is driven in an SPC (Short PWM Code) mode applying the SENT communication method, and starts communication in response to a trigger signal from the microcomputer 70. Note that, in FIG. 1, illustrations of a transmission circuit, an operating power supply line, a reference potential line, etc. are omitted.

The microcomputer 70 includes two systems of reception units 501 and 502 and abnormality determination units 761 and 762 provided corresponding to the sensor devices 301 and 302, and a torque computing unit 77 and an assist amount computing unit 78 provided in common to the two systems. The torque computing unit 77 corresponds to a "physical quantity computing unit," and the assist amount computing unit 78 corresponds to a "control amount computing unit."

Regarding the configuration within the microcomputer 70, the configurations of the first system and the second system are the same, so the first system will mainly be described, and the description of the second system will be omitted as appropriate. As for the trigger signal generation units, the first system trigger signal generation units are denoted by reference numerals "63A, 63B," and the second system trigger signal generation units are denoted by reference numerals "64A, 64B." A timer in one microcomputer 70 causes the trigger signal generation units of the two systems of the reception units 501 and 502 to generate trigger signals, which will be described later, in synchronization with each other.

The first reception unit 501 receives signals including sensor values S1A and S1B transmitted from the sensor elements 31A and 31B of the first sensor device 301. The first reception unit 501 includes two signal acquisition units 61A and 61B and two trigger signal generation units 63A and 63B. In particular, in the present embodiment, the signal acquisition units 61A and 61B are configured as a SENT module together with the trigger signal generation units 63A and 63B.

Figure 2:
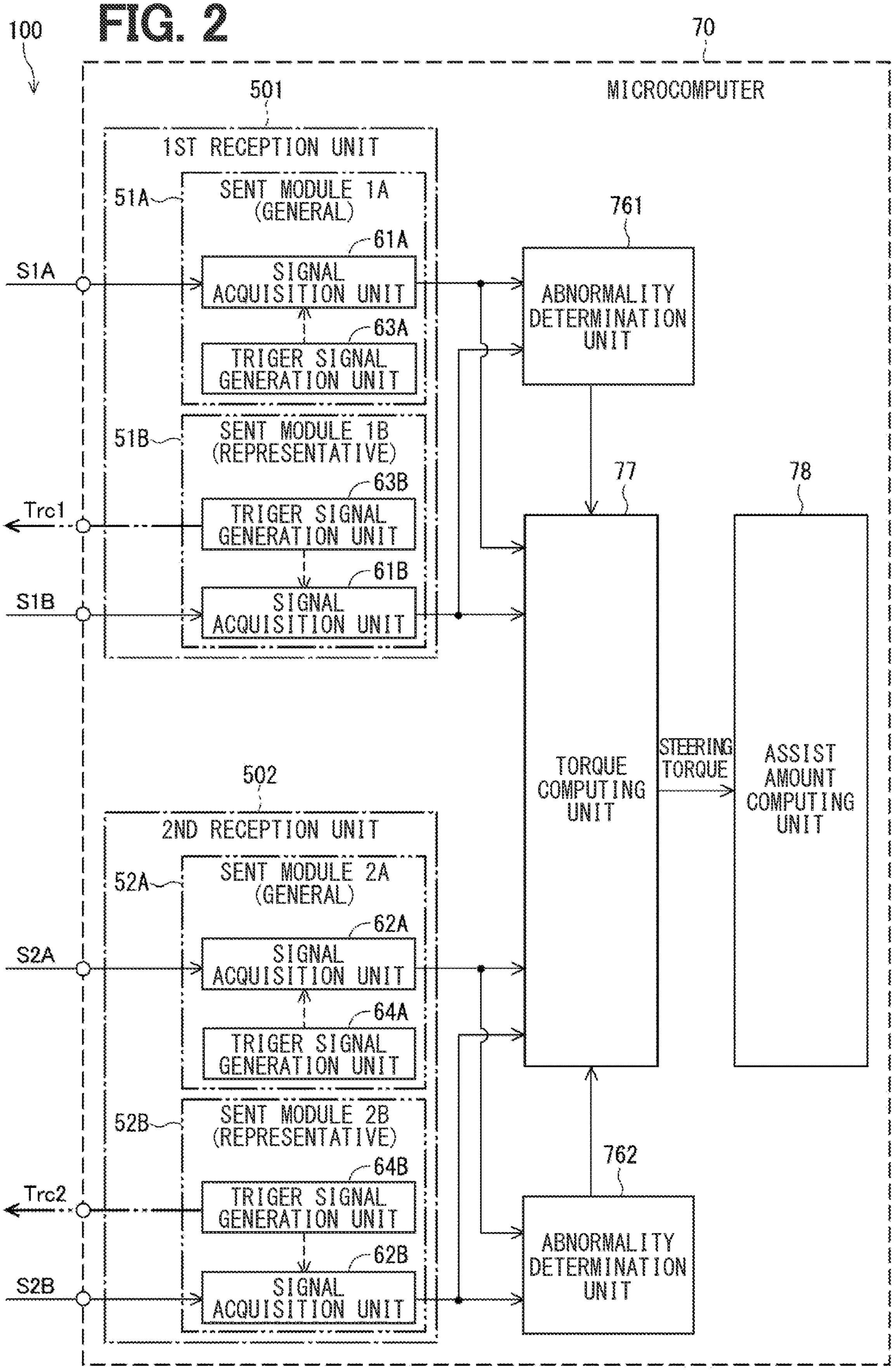
FIG. 2 is a block diagram of a microcomputer of the communication system according to the first embodiment.

The SENT module 51A corresponding to the sensor element 31A includes the signal acquisition unit 61A and the trigger signal generation unit 63A. The SENT module 51B corresponding to the sensor element 31B includes the signal acquisition unit 61B and a trigger signal generation unit 63B. In FIGS. 1 and 2, the SENT module indicated by the reference numeral 51A is referred to as a "SENT module 1A," and the SENT module indicated by reference numeral 51B is referred to as a "SENT module 1B."

The signal acquisition units 61A and 61B are connected to the sensor elements 31A and 31B of the corresponding sensor device 301 via individual communication channels 41A and 41B. When the communication channels 41A, 41B are in a transmittable state, the signal acquisition units 61A, 61B acquire the sensor values S1A, S1B transmitted via the communication channels 41A, 41B. Both trigger signal generation units 63A and 63B generate trigger signals. However, as described below, the trigger signal generated by the trigger signal generation unit 63A and the trigger signal generated by the trigger signal generation unit 63B are used differently.

Here, among the two SENT modules 51A and 51B included in the first reception unit 501, one SENT module 51B is defined as a "representative module," and the SENT module 51A other than the representative module is defined as a "general module."

The trigger signal generated by the trigger signal generation unit 63B of the SENT module 51B, which is the representative module, is output to the communication channels 41A and 41B as a "transmission trigger signal Trc1" common to the first system. The common transmission trigger signal Trc1 simultaneously puts the two communication channels 41A and 41B in a transmittable state. That is, the trigger signal generation unit 63B of the representative module functions as one/single "transmission trigger signal generation unit" in the first reception section 501. In the first reception unit 501, the two signal acquisition units 61A and 61B can simultaneously acquire the sensor values S1A and S1B using a common transmission trigger signal Trc1.

Further, the trigger signal generated by the trigger signal generation unit 63B is also used as an "intra-module trigger signal" that causes the signal acquisition unit 61B in the own module 51B to transition to a receivable state. That is, the trigger signal generated by the trigger signal generation unit 63B of the representative module 51B is used as a "transmission trigger signal that also serves as an intra-module trigger signal."

On the other hand, the trigger signal generated by the trigger signal generation unit 63A of the SENT module 51A, which is a general module, is used only as an "intra-module trigger signal" for transitioning the signal acquisition unit 61A in the own module 51A to a receivable state. Since the generated trigger signal is not used as a transmission trigger signal for the corresponding communication channel 41A, the operation by the trigger signal generation unit 63A of the general module is an operation in which a trigger signal is generated in the SPC mode but not output to the communication channel 41A. Therefore, it is commonly referred to as "empty firing." The effects of such configuration will be described later in comparison with a comparative example.

Next, a first abnormality determination unit 761 determines whether the sensor values S1A and S1B transmitted from the sensor elements 31A and 31B of the first sensor device 301 are abnormal. Similarly, a second abnormality determination unit 762 determines whether the sensor values S2A and S2B transmitted from the sensor elements 32A and 32B of the second sensor device 302 are abnormal. Processing by the first and second abnormality determination units 761 and 762 will be described later with reference to FIGS. 5A to 7.

The torque computing unit 77 calculates the steering torque based on the plurality of sensor values S1A, S1B, S2A, and S2B received by the two systems of reception units 501 and 502, and abnormality information determined by the abnormality determination units 761 and 762. The processing by the torque computing unit 77 will be described later with reference to FIG. 8. The assist amount computing unit 78 calculates an assist amount output by a motor 80 as a "predetermined control amount" based on the steering torque calculated by the torque computing unit 77.

Figure 3:
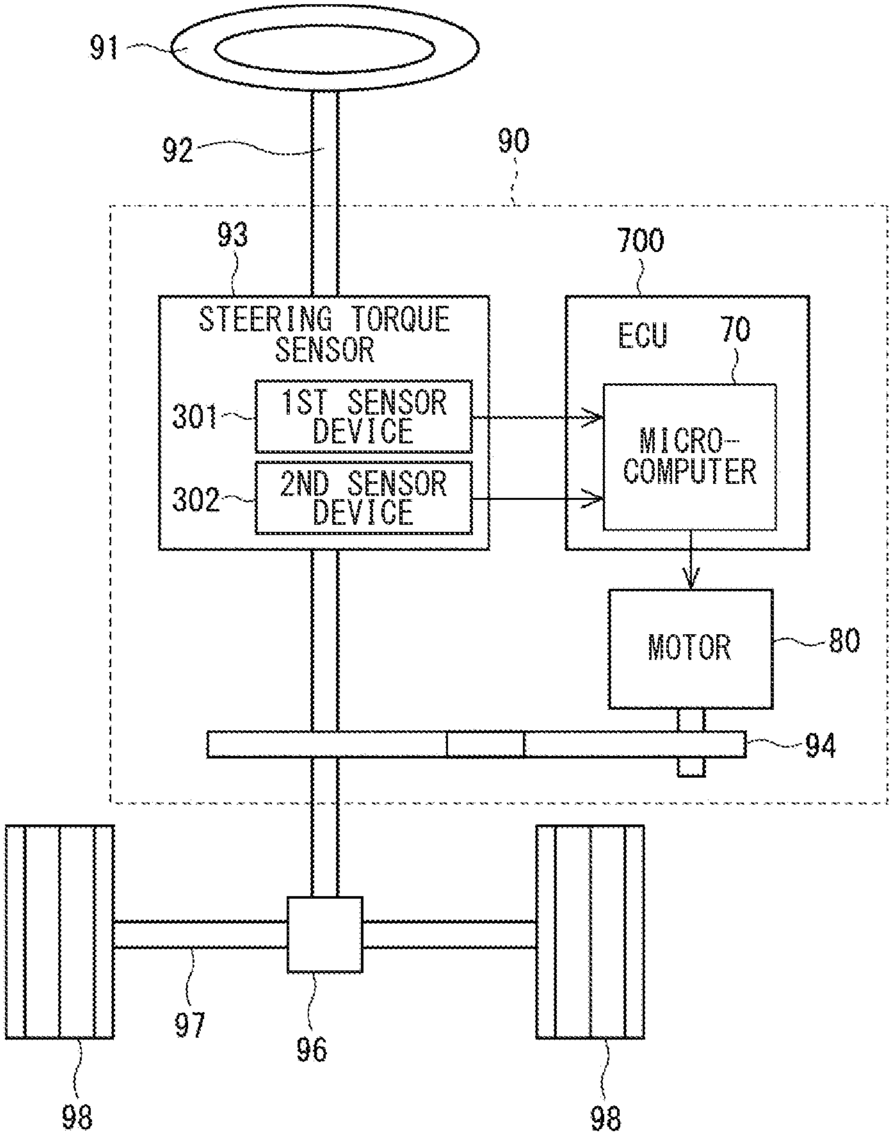
FIG. 3 is a schematic configuration diagram of an electric power steering device to which the communication system is applied.

Here, with reference to FIG. 3, a schematic configuration of an electric power steering device to which the communication system 100 is applied will be described. Although an electric power steering device 90 shown in FIG. 3 is of a column-assist type, it is similarly applicable to a rack-assist type electric power steering device. A steering shaft 92 is coupled to a steering wheel 91. A pinion gear 96 provided at a tip end of the steering shaft 92 engages with a rack shaft 97. A pair of wheels 98 are provided at both ends of the rack shaft 97 via tie rods or the like. When a driver rotates the steering wheel 91, the steering shaft 92 coupled to the steering wheel 91 rotates. A rotational motion of the steering shaft 92 is converted into a linear motion of the rack shaft 97 by the pinion gear 96, and the pair of wheels 98 is steered to an angle corresponding to a displacement amount of the rack shaft 97.

The electric power steering device 90 includes the steering torque sensor 93, an ECU (control unit) 700, the motor 80, a speed reduction gear 94, and the like. The steering torque sensor 93 is provided in the middle of the steering shaft 92 and detects the steering torque of the driver. The steering torque sensor 93 of the present embodiment includes two sensor devices 301 and 302 redundantly. Further, the steering torque sensor 93 includes, in addition to the sensor devices 301 and 302, a torsion bar, a multipolar magnet, a magnetic yoke, a magnetic flux collecting ring, and the like. Since these configurations are well known, illustration thereof will be omitted.

The ECU 700 is configured by using the microcomputer 70, a pre-driver (not shown) and the like, and includes a CPU, a ROM, a RAM, an I/O, and a bus line connecting these configurations. The ECU 700 performs control (a) by software processing by executing a pre-stored program on the CPU and (b) by hardware processing by a dedicated electronic circuit.

The assist amount computing unit 78 of the microcomputer 70 calculates an assist amount (i.e., an assist torque instruction) output by the motor 80 based on the sensor value acquired from the steering torque sensor 93, and controls the energization of the motor 80 accordingly. The motor 80 is composed of, for example, a three-phase brushless motor. The assist torque generated by the motor 8 is transmitted to the steering shaft 92 via the speed reduction gear 94. The motor 80 may be configured to have one body with the ECU 700.

Figure 12:
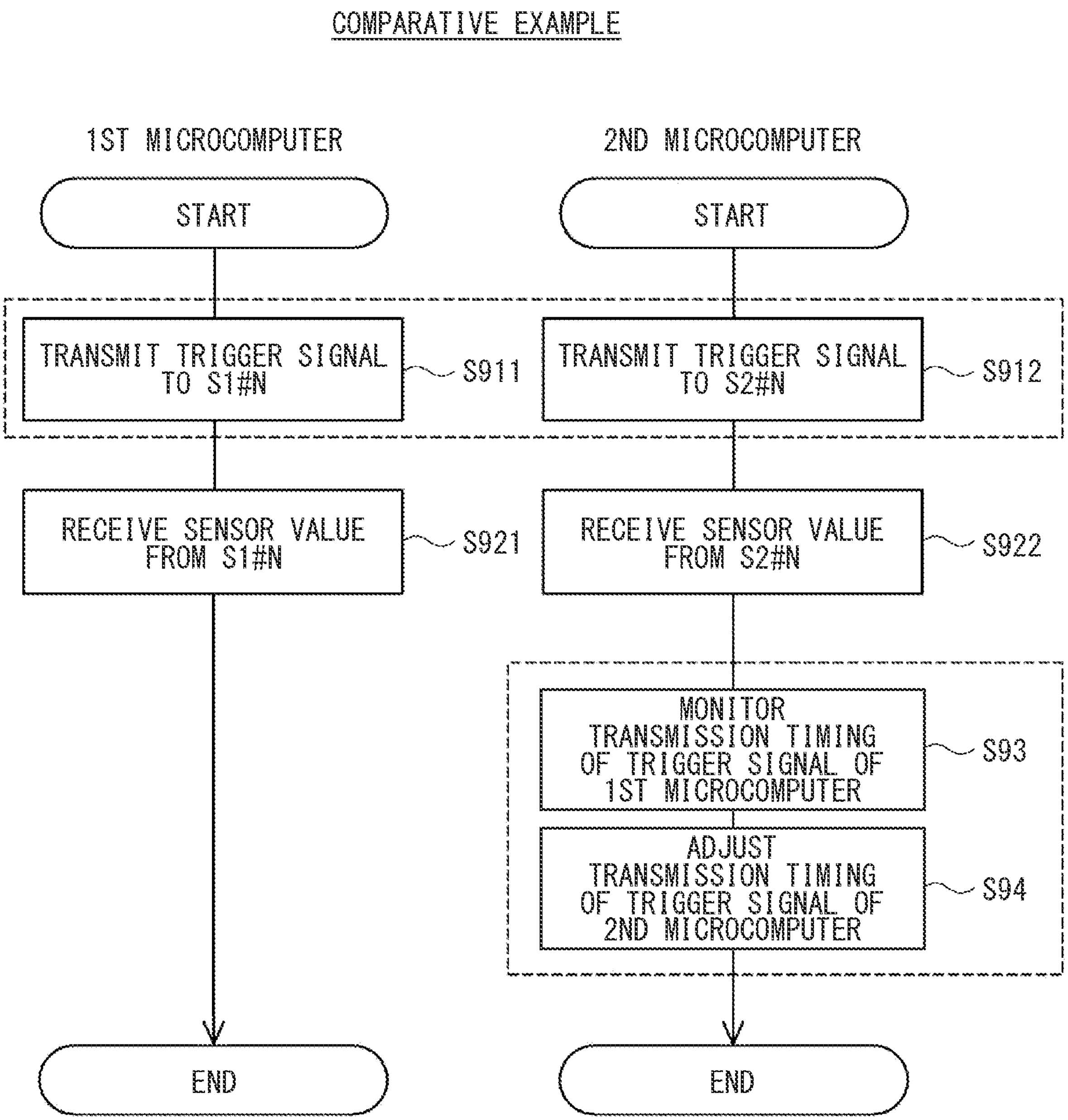
FIG. 12 is a flowchart of synchronization processing according to a comparative example.

As a conventional technology in the technical field of communication systems as described above, Patent Document 1 (Japanese Unexamined Patent Publication No. 2018-106513) discloses a detection device that synchronizes the transmission timing of a trigger signal for SENT communication with two microcomputers. The flowchart in FIG. 12 shows synchronization processing according to a comparative example. In the following description of the flowchart, the symbol "S" means a step. The left column of FIG. 12 shows the processing of the first microcomputer, and the right column shows the processing of the second microcomputer.

The first microcomputer transmits a trigger signal to a sensor S1 #N in S911, and receives a sensor value (measurement data) from the sensor S1 #N in S921. The second microcomputer transmits a trigger signal to a sensor S2 #N in S912, and receives a sensor value (measured data) from the sensor S2 #N in S922. Here, the measurement targets of the sensor S1 #N and sensor S2 #N are the same, and simultaneity of sensor values is required. However, since the transmission timing of S911 and S912 is based on the calculation timing of respective microcomputers, a shift may occur in the transmission timing.

Therefore, the second microcomputer monitors a trigger signal transmission timing of the first microcomputer in S93, and adjusts the trigger signal transmission timing of the second microcomputer so that the trigger signal transmission timings of both microcomputers match in S94. In such manner, simultaneity of the sensor values from the sensor S1 #N and the sensor S2 #N is ensured.

However, in a typical communication system, the plurality of sensors S1 #1 to #N corresponding to the first microcomputer do not measure the same object. That is, a configuration in which a plurality of sensor values for the same measurement target are acquired by different signal acquisition units within one microcomputer as in the present embodiment is not disclosed. If an idea of Patent Document 1 is applied to the trigger signal transmission timing between the plurality of SENT modules 51A and S52A in the first reception unit 501 of the present embodiment, the microcomputer will need extra computing power. In contrast, in the present embodiment, the simultaneity of sensor values is ensured without increasing the computing power.

Figure 4:
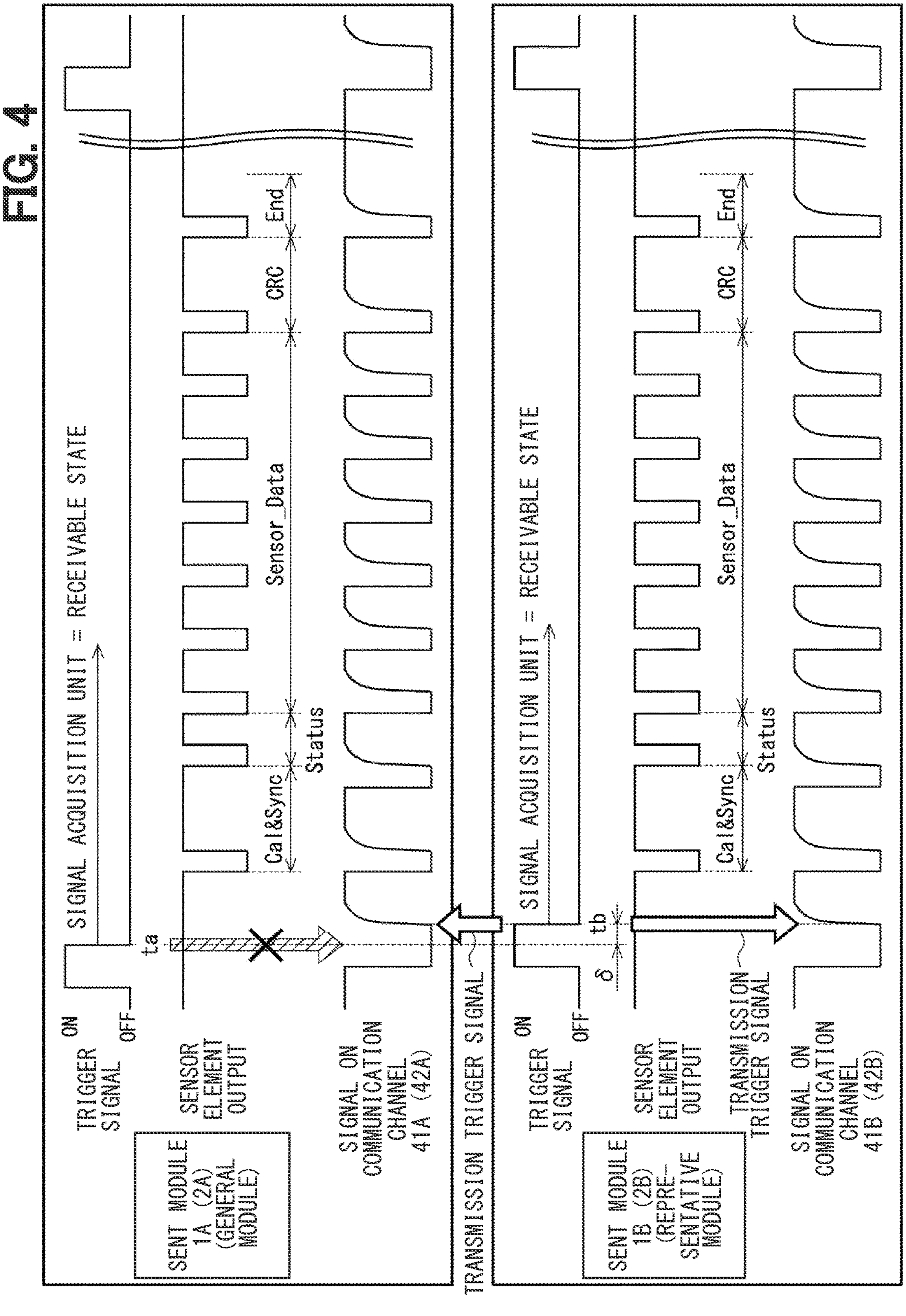
FIG. 4 is a timing chart of a relationship between a trigger signal and transmission of sensor values.

Next, with reference to the timing chart of FIG. 4, the timing of signals from the sensor elements 31A and 31B being transmitted to the communication channels 41A and 41B will be described. In the following, reference numerals of the first system are used. The same applies to the timing of signals transmitted from the second system sensor elements 32A, 32B to the communication channels 42A, 42B.

For example, a switching element is provided at a position between the communication channels 41A and 41B and the ground. When the trigger signal is turned ON and input to a gate of the switching element, the switching element becomes conductive, electric current passing through the communication channels 41A and 41B flows to ground, and transmission is interrupted. When the trigger signal is turned OFF, the switching element is cut off, and the communication channels 41A and 41B are put in a transmittable state. That is, each of the communication channels 41A, 41B is put in a transmittable state at a timing when the trigger signal input to the gate of the switching element provided in each of the communication channels 41A, 41B is once turned ON and then turned OFF. In such configuration example, the trigger signal input to the gate of the switching element is defined as a "transmission trigger signal" in the present embodiment.

By the way, the timing of the trigger signals generated by the two SENT modules 51A and 51B in one reception unit 501 may be shifted. In the example shown in FIG. 4, the timing to when the trigger signal of the SENT module 51A is turned ON and then turned OFF is shifted from the timing tb when the trigger signal of the SENT module 51B is turned ON then turned OFF by an amount of time δ.

Figure 11:
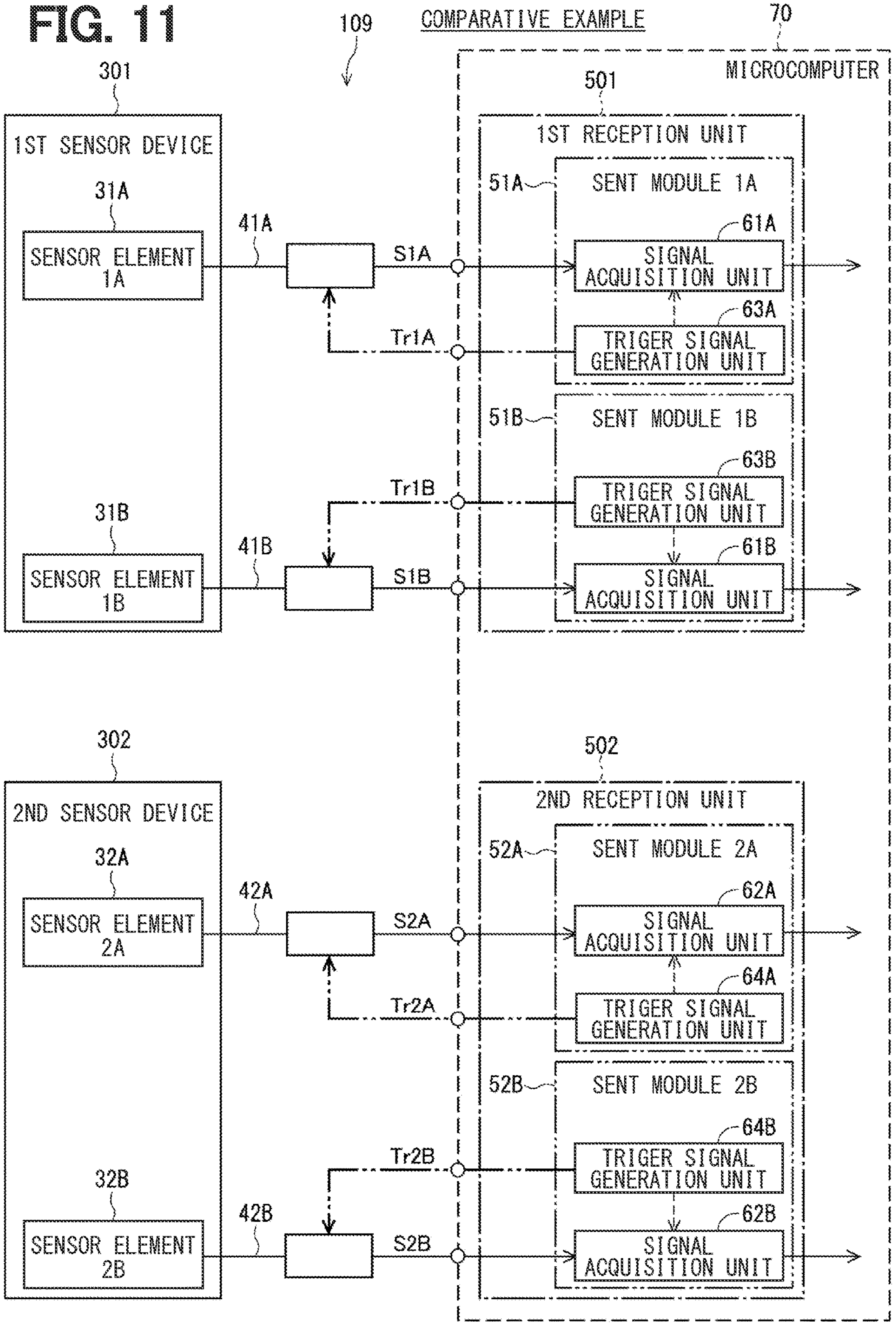
FIG. 11 is a schematic block diagram of a communication system of a comparative example.

Here, with reference to FIG. 11, the configuration of the communication system 109 as a comparative example will be described. In the communication system 109 of the comparative example, transmission trigger signals Tr1A and Tr1B are individually output from the trigger signal generation units 63A and 63B of respective SENT module 51A and 51B of the first reception unit 501 to the corresponding communication channels 41A and 41B. Similarly, transmission trigger signals Tr2A and Tr2B are individually output from the trigger signal generation units 64A and 64B of the SENT modules 52A and 52B of the second reception unit 502 to the corresponding communication channels 42A and 42B.

Therefore, for example, if the timings of the transmission trigger signals Tr1A and Tr1B are shifted in the first system, the signal acquisition units 61A and 61B may acquire sensor values at different timings from the sensor elements 31A and 31B. Then, there is a possibility that the microcomputer 70 may calculate an incorrect torque or erroneously detect an abnormality in the sensor value.

In addition, in the comparative example, it is necessary to output the transmission trigger signals Tr1A and Tr1B individually to the communication channels 41A and 41B through which the sensor values S1A and S1B are transmitted, which increases the number of the signal output terminals and the number of connection steps of the microcomputer 70. In the comparative example shown in FIG. 11, two terminals from which the first reception unit 501 outputs the transmission trigger signals Tr1A and Tr1B are required.

On the other hand, in the present embodiment, the trigger signal of the SENT module 51A, which is a general module, is used only as an intra-module trigger signal that transitions the signal acquisition unit 61A to a receivable state, and does not function as a trigger signal that puts the communication channel 41A in the transmittable state. On the other hand, the trigger signal of the SENT module 51B, which is the representative module, is used as an intra-module trigger signal that transitions the signal acquisition unit 61B to a reception-enabled state, and is also used as a transmission trigger signal that puts both of the communication channels 41A and 41B in a transmittable state. Therefore, the timing to is ignored, and signal transmission from the sensor elements 31A, 31B to the signal acquisition units 61A, 61B is started simultaneously at the timing tb when the common transmission trigger signal is turned ON and then turned OFF.

The signals from the sensor elements 31A and 31B are respectively output as a series of signals in one frame, including a calculation and synchronization (Cal & Sync) signal, a status signal, a sensor data signal, a CRC signal, and an end signal. The SENT method is a transmission method that allows bidirectional communication using a 4-bit nibble signal. The size of the sensor data signal containing the steering torque sensor values S1A and S1B is 3 nibbles (12 bits), and a maximum of $2^{12}$ (4096) data values from "000" to "FFF" can be transmitted. The signal acquisition units 61A and 61B receive the SENT method signal, and acquire the sensor values S1A and 51B included in the signal.

In such manner, in the present embodiment, in one reception unit 501, the two signal acquisition units 61A and 61B can simultaneously acquire the two sensor values S1A and S1B using the common transmission trigger signal Trc1. Therefore, it is possible to ensure the simultaneity of the plurality of sensor values S1A and S1B that the microcomputer 70 acquires from the sensor device 301. Therefore, the microcomputer 70 is prevented from calculating an incorrect torque based on sensor values acquired at different timings or from erroneously detecting an abnormality in the sensor values.

Further, in the present embodiment, one transmission trigger signal Trc1 is output for one reception unit 501, thereby enabling reduction of (a) the number of the signal output terminals of the microcomputer 70 and (b) the number of wiring steps. That is, as shown in FIGS. 1 and 2, only one terminal is required to output the transmission trigger signal Trc1 from the first reception unit 501. Therefore, it is possible to have a simple configuration.

Figure 5A:
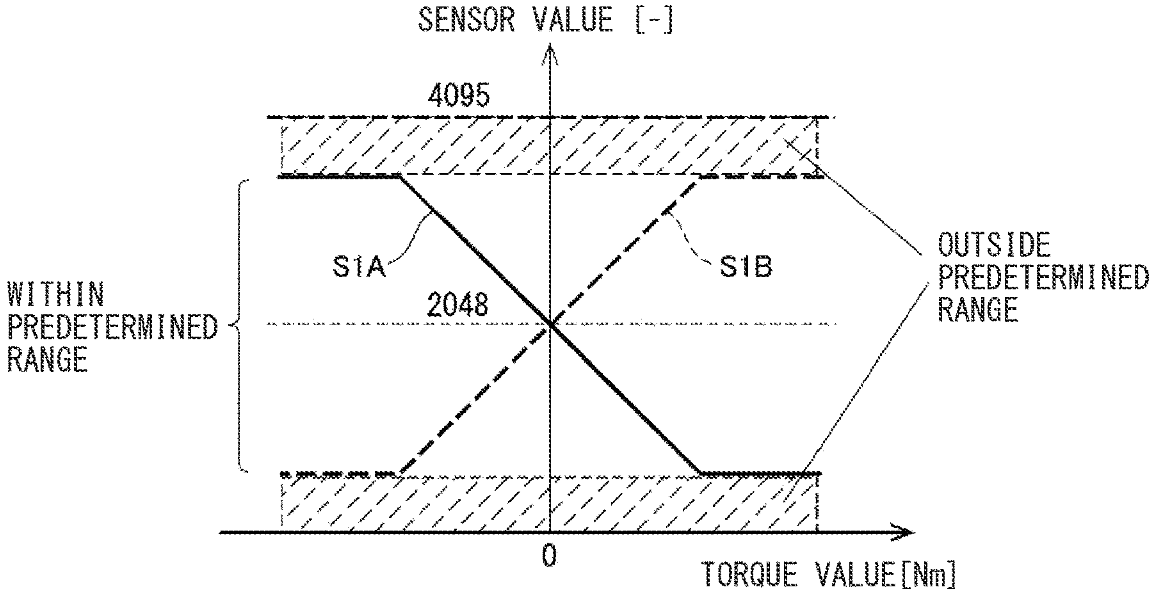
FIG. 5A is a sensor characteristic diagram of a first sensor device.
Figure 5B:
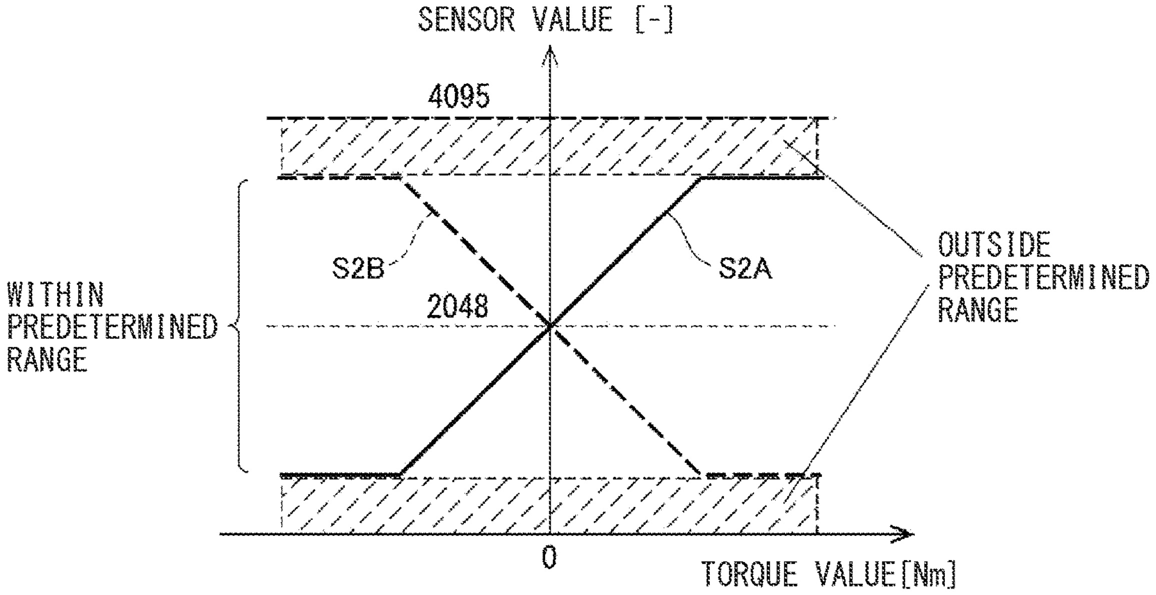
FIG. 5B is a sensor characteristic diagram of a second sensor device.

Next, processing by the first and second abnormality determination units 761 and 762 will be described with reference to FIGS. 5A to 7. As shown in FIGS. 5A and 5B, normal sensor values S1A, S1B, S2A, and S2B are values within a predetermined range of values out of 0 to 4095, which is a range excluding a lower limit range around 0 and an upper limit range around 4095. The lower limit range and upper limit range excluded here are "outside the predetermined range." If the sensor values S1A, 51B, S2A, and S2B are values outside the predetermined range, it is determined that an abnormality has occurred.

Further, in the present embodiment, two sensor values from two sensor elements of each system have a cross characteristic. One sensor value having the cross characteristic is a positive characteristic sensor value that has a linear output characteristic of positive correlation with an actual torque. The other sensor value having the cross characteristic is a negative characteristic sensor value that has a linear output characteristic of negative correlation with the actual torque, in which the inclination of a linear output of the negative characteristic sensor value has the same absolute value of the inclination of the positive characteristic sensor value.

For example, in the first sensor device 301, the sensor value S1B corresponds to a positive characteristic sensor value, and the sensor value S1A corresponds to a negative characteristic sensor value. In the second sensor device 302, the sensor value S2A corresponds to a positive characteristic sensor value, and the sensor value S2B corresponds to a negative characteristic sensor value. The positive characteristic sensor value and the negative characteristic sensor value take symmetrical values that centers on 2048, and the sum of the positive characteristic sensor value and the negative characteristic sensor value is 4096. If the sum of the positive characteristic sensor value and the negative characteristic sensor value deviates from a predetermined range of around 4096, the abnormality determination units 761 and 762 determine that at least one sensor value is abnormal.

Figure 6:
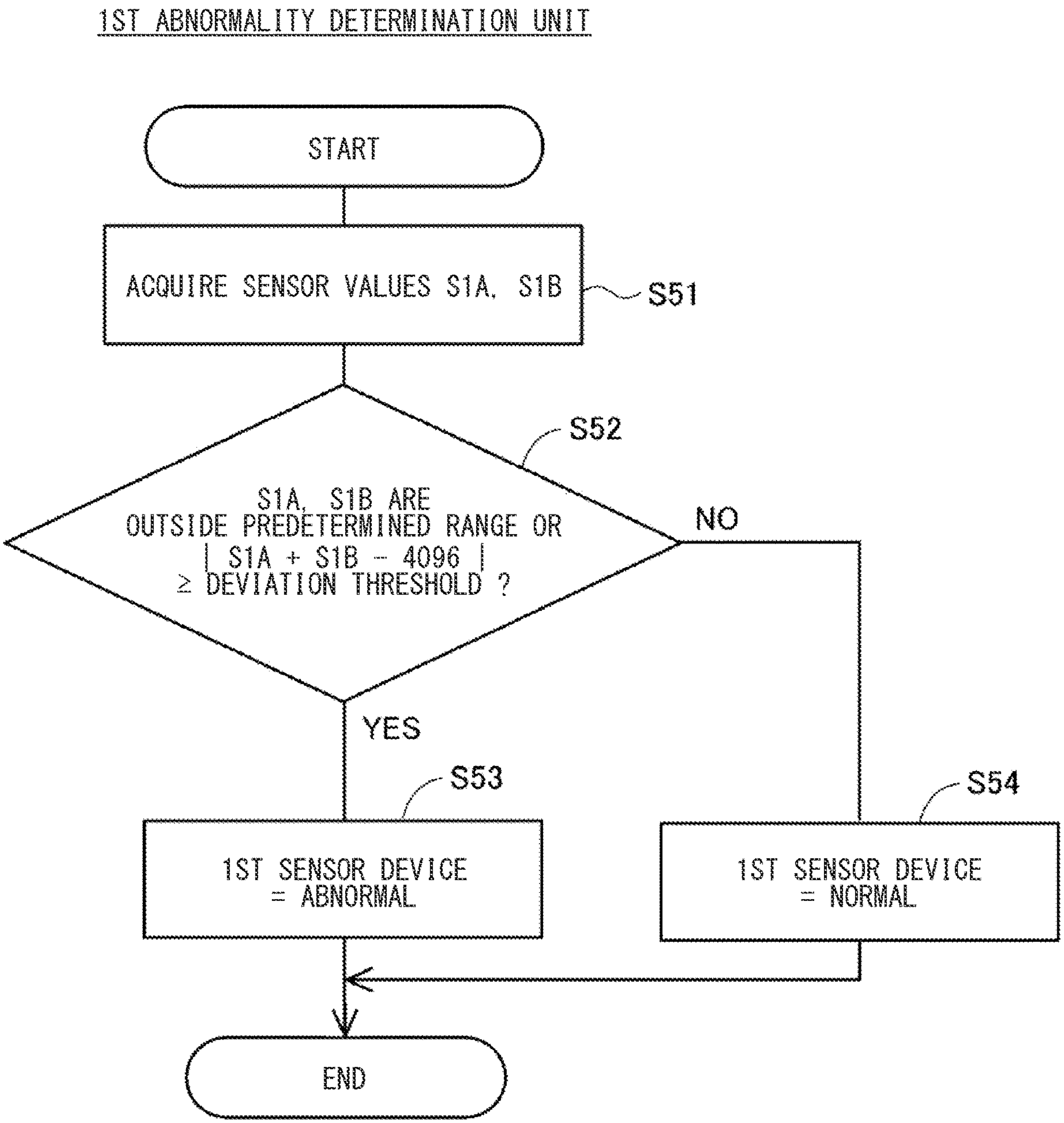
FIG. 6 is a flowchart of processing by a first abnormality determination unit.

In S51 of FIG. 6, the first abnormality determination unit 761 acquires the sensor values S1A and S1B. In S52, it is determined whether the sensor values S1A and S1B are outside the predetermined range shown in FIG. 5A, or whether the absolute value of the difference between the sum of the sensor values S1A and S1B and 4096 is equal to or greater than a deviation threshold. If YES in S52, the first abnormality determination unit 761 determines in S53 that the first sensor device 301 that has output at least one abnormal sensor value is abnormal. If NO in S52, the first abnormality determination unit 761 determines in S54 that the first sensor device 301 is normal.

Figure 7:
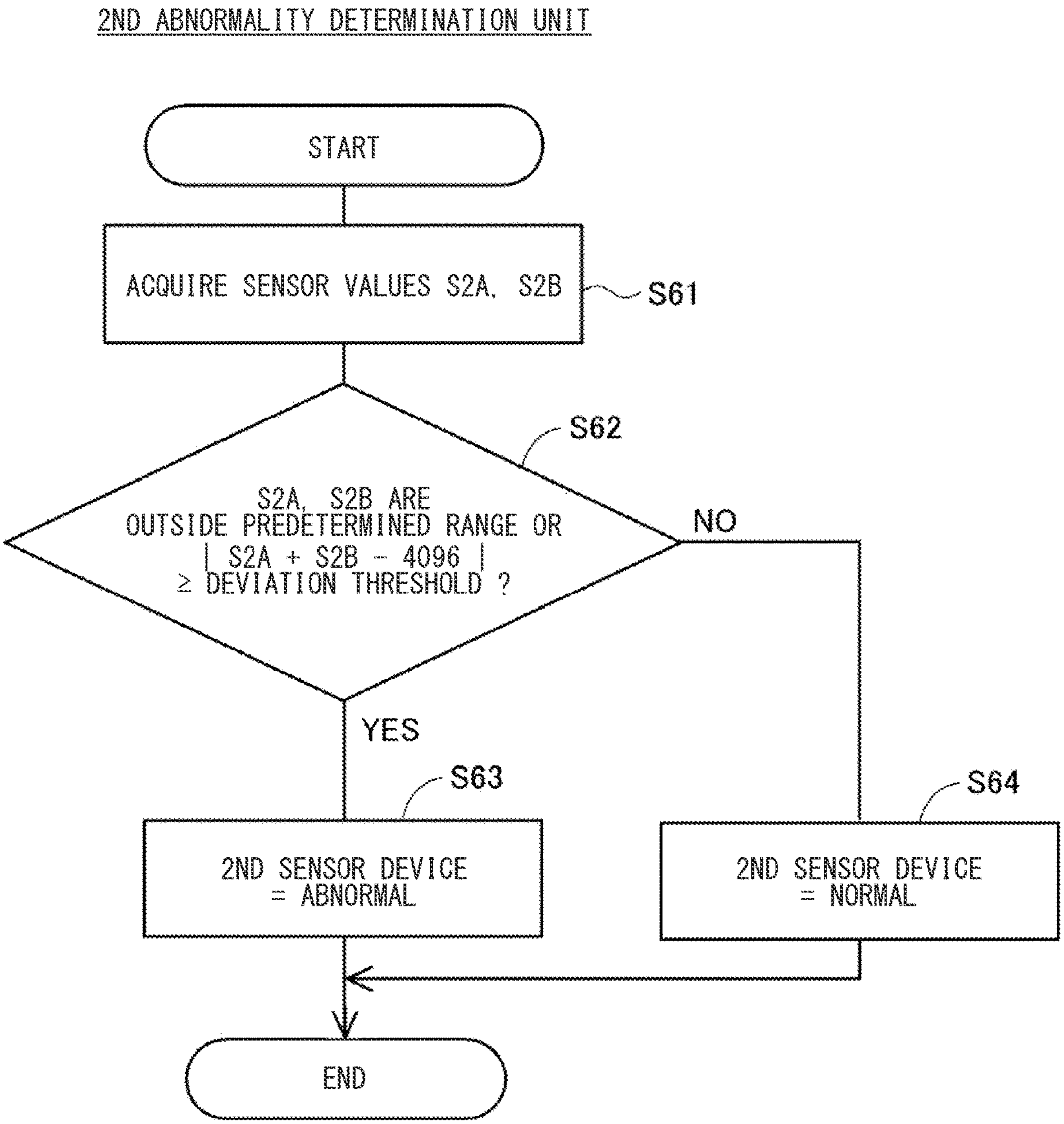
FIG. 7 is a flowchart of processing by a second abnormality determination unit.

Similar to FIG. 6, in S61 of FIG. 7, the second abnormality determination unit 762 acquires the sensor values S2A and S2B. In S62, it is determined whether the sensor values S2A and S2B are outside the predetermined range shown in FIG. 5B, or whether the absolute value of the difference between the sum of the sensor values S2A and S2B and 4096 is equal to or greater than the deviation threshold. If YES in S62, the second abnormality determination unit 762 determines in S63 that the second sensor device 302 that has output at least one abnormal sensor value is abnormal. If NO in S62, the second abnormality determination unit 762 determines in S64 that the second sensor device 302 is normal.

For example, in abnormality determination based on the sum of sensor values with cross characteristics, if the simultaneity of the sensor values is not ensured, an abnormality may be erroneously detected. In the present embodiment, by ensuring the simultaneity of sensor values using the common transmission trigger signals Trc1 and Trc2, erroneous detection of an abnormality is prevented.

Figure 8:
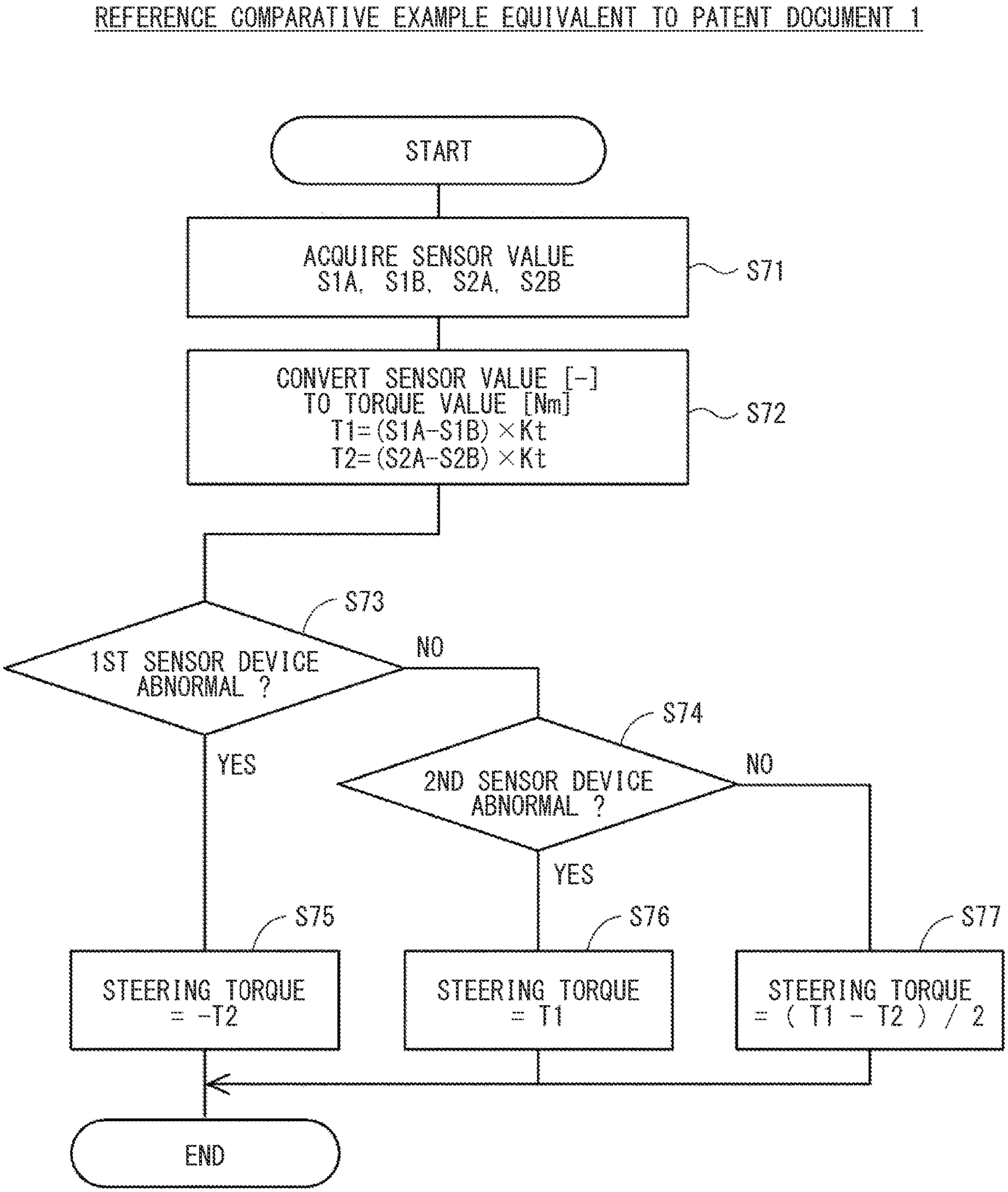
FIG. 8 is a flowchart of processing by a torque computing unit.

Next, with reference to FIG. 8, processing by the torque computing unit 77 will be described. In S71, the torque computing unit 77 obtains four sensor values S1A, S1B, S2A, and S2B. In S72, the torque computing unit 77 converts the sensor values, which are dimensionless numbers from 0 to 4095, into torque values T1 and T2 [Nm] for each system using equations (1) and (2). Kt is a conversion gain. The sign of the conversion gain Kt is determined as appropriate depending on the definition of positive or negative of the torque value or sensor value. In the present embodiment, T1 and T2 have opposite signs.

$$T1=(S1A-S1B)\cdot Kt \tag{1}$$

$$T2=(S2A-S2B)\cdot Kt \tag{2}$$

In S73 and S74, it is determined whether or not there is an abnormality in the sensor devices 301 and 302. When either of the sensor devices is determined as abnormal by the abnormality determination units 761 and 762, the microcomputer 70 continues calculation using only the sensor value of the sensor devices in a normal system. Note that FIG. 8 assumes that a double failure in which both of the sensor devices 301 and 302 fail does not occur.

If the first sensor device 301 is determined to be abnormal by the abnormality determination unit 761, YES is determined in S73, and the process proceeds to S75. In S75, the torque value (−T2) of the second system is adopted as the steering torque. If the second sensor device 302 is determined as abnormal by the abnormality determination unit 762, NO is determined in S73, YES is determined in S74, and the process proceeds to S76. In S76, the torque value T1 of the first system is adopted as the steering torque.

If both of the sensor devices 301 and 302 are normal, NO is determined in S73, YES is determined in S74, and the process proceeds to S77. In S77, an average value ((T1−T2)/2) of the torque values of the two systems is adopted as the steering torque.

In the equations (1) and (2), since the torque value is calculated based on the difference between the sensor values, erroneous torque values T1 and T2 may possibly be calculated. In the present embodiment, by ensuring the simultaneity of sensor values using the common transmission trigger signals Trc1 and Trc2, calculation of an incorrect torque value is prevented.

Second Embodiment

Figure 9:
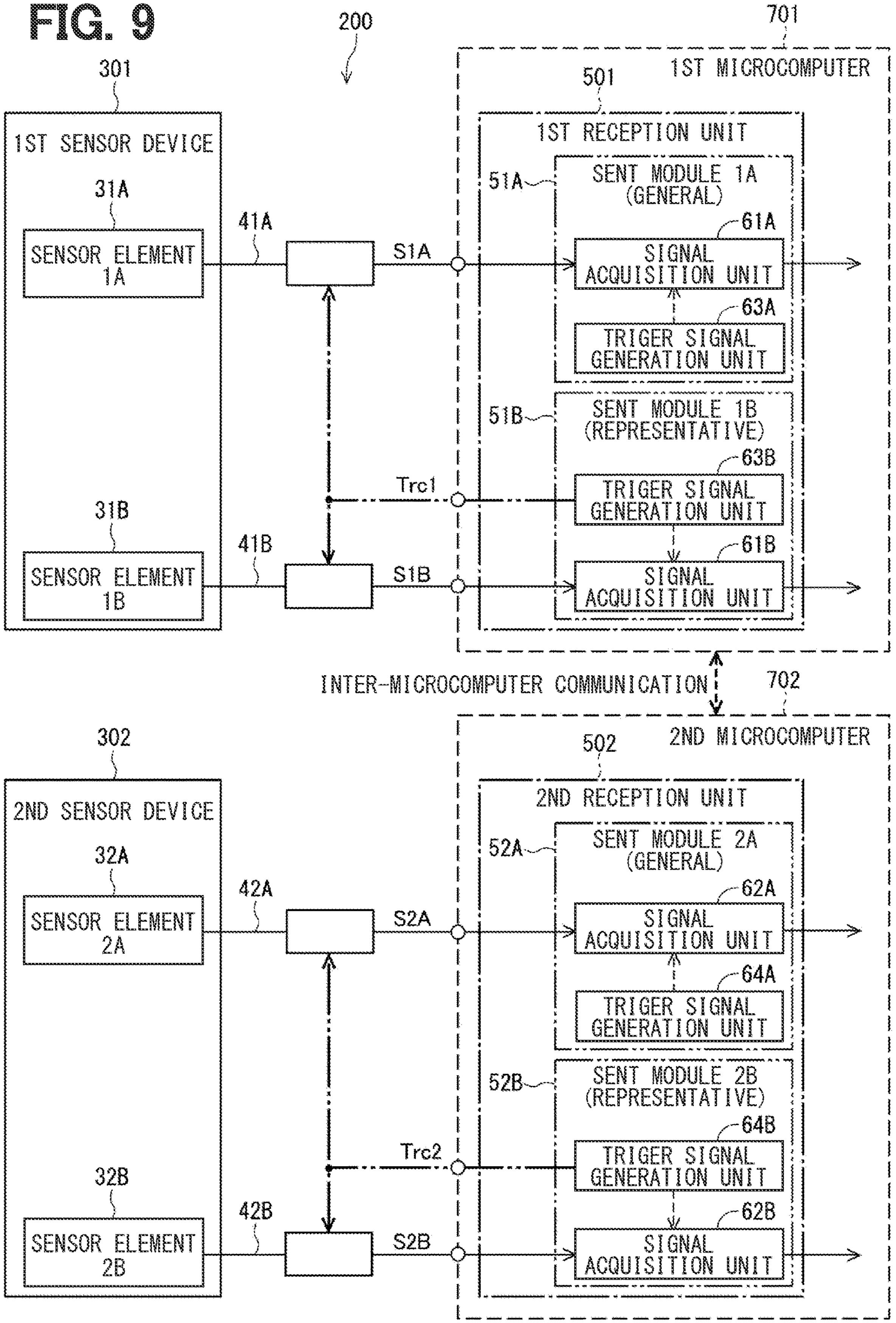
FIG. 9 is a schematic block diagram of a communication system according to a second embodiment.
Figure 10:
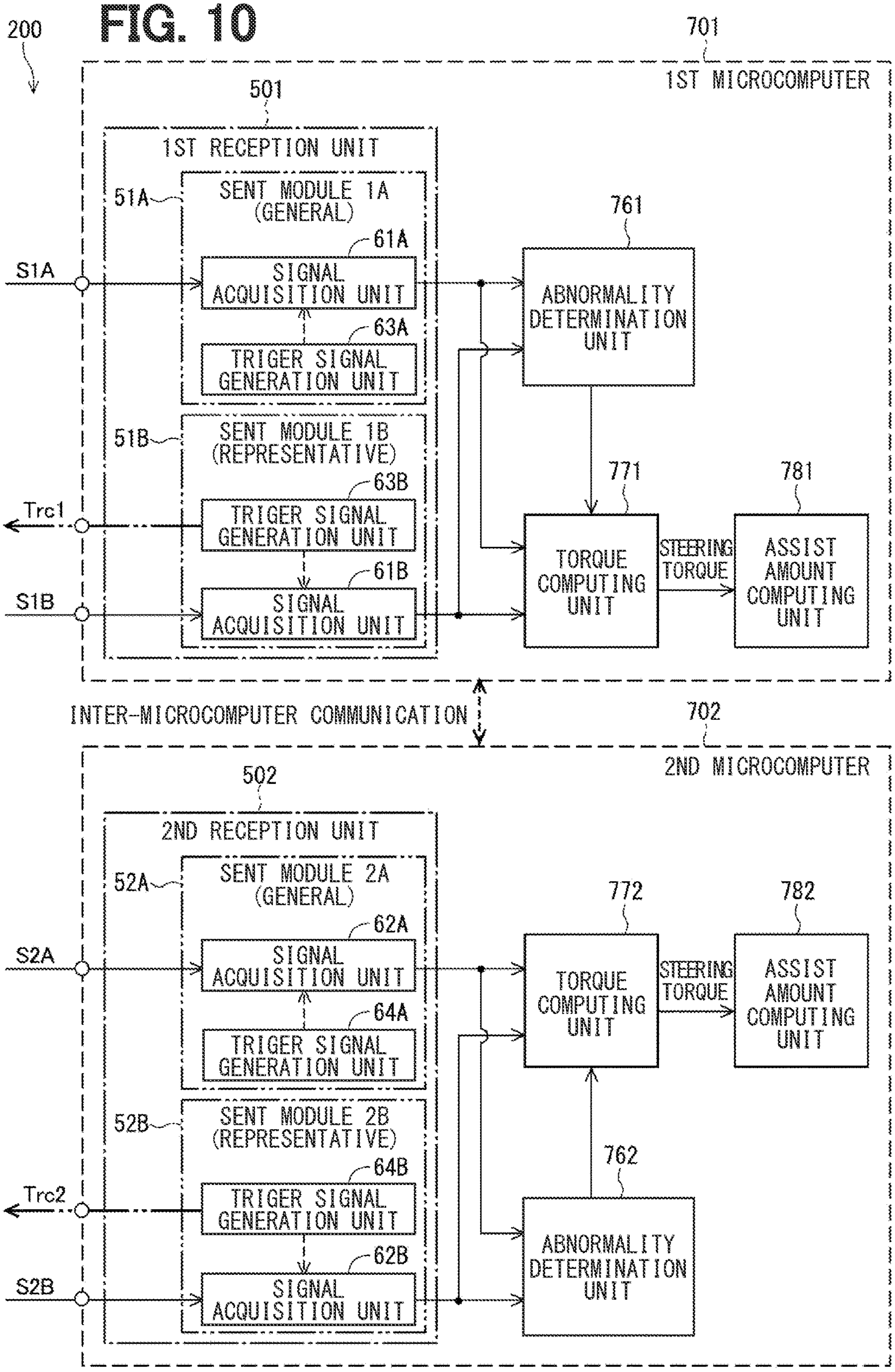
FIG. 10 is a block diagram of a microcomputer of the communication system according to the second embodiment.

A communication system 200 according to the second embodiment will be described with reference to FIGS. 9 and 10. FIGS. 9 and 10 correspond to FIGS. 1 and 2 of the first embodiment, respectively. The communication system 200 of the second embodiment includes two microcomputers 701 and 702 for each system, corresponding to the two systems of the sensor devices 301 and 302. The two systems of the microcomputers 701 and 702 each have the reception units 501 and 502, the abnormality determination units 761 and 762, torque computing units 771 and 772, and assist amount computing units 781 and 782.

The first microcomputer 701 calculates a steering torque T1 in the torque computing unit 771 based on the sensor values S1A and S1B acquired from the two sensor elements 31A and 31B of the first sensor device 301, and calculates an assist amount in the assist amount computing unit 781. The second microcomputer 702 calculates a steering torque T2 in the torque computing unit 772 based on the sensor values S2A and S2B acquired from the two sensor elements 32A and 32B of the second sensor device 302, and calculates an assist amount in the assist amount computing unit 782.

The microcomputers 701 and 702 communicate information with each other through inter-microcomputer communication. As a result, the trigger signal generation units 63B and 64B of the two systems of the reception units 501 and 502 generate the transmission trigger signals Trc1 and Trc2 in synchronization with each other. Further, the torque computing units 771 and 772 calculate the steering torque based on the abnormality information determined by the abnormality determination units 761 and 762 of the own system and other system. The calculation results of each of the torque computing unit 771, 772 and each of the assist amount computing unit 781, 782 are arbitrated as required.

In the communication system 200 of the second embodiment, the microcomputers 701 and 702 are provided redundantly, so even if one of the microcomputers becomes abnormal, the calculation of the assist amount is continuable by using the calculation result of the normal microcomputer.

Other Embodiments (a) One sensor device may include three or more sensor elements, and correspondingly, one reception unit of the microcomputer may include three or more signal acquisition units. For example, one reception unit corresponding to three sensor elements is composed of one representative module and two general modules. The transmission trigger signal generated by the trigger signal generation unit of the representative module is distributed to three communication channels, and simultaneously puts the three communication channels in a transmittable state.

(b) The communication system is not limited to two systems, but may include one system, or three or more systems of sensor devices and reception units. In a communication system with a single system configuration, it is only necessary that a common transmission trigger signal enables a plurality of signal acquisition units to simultaneously acquire a plurality of sensor values between one sensor device and one reception unit. Further, when a microcomputer is provided for each of three or more systems, the transmission trigger signals of each microcomputer may be generated in synchronization with each other through communication between the three or more microcomputers.

(c) For example, the signal acquisition units 61A and 61B of the first reception unit 501 do not have to be configured as a module together with the trigger signal generation units 63A and 63B. Further, means for putting the signal acquisition units 61A and 61B in a receivable state is not limited to the intra-module trigger signal from the trigger signal generation units 63A and 63B. If the signal acquisition units 61A and 61B do not require an intra-module trigger signal, the trigger signal generation unit 63A that does not function as a transmission trigger signal generation unit is omissible.

(d) In cases where the possibility of having an abnormality in the sensor value is substantially equal to zero, or in cases where there is no effect even if an abnormality occurs, the microcomputer does not have to include an abnormality determination unit. Further, the characteristics of the two sensor values are not limited to cross characteristics, but may be characteristics that both have a positive correlation with the actual physical quantity or characteristics that both have a negative correlation therewith.

(e) The physical quantity detected by the sensor element and calculated by the physical quantity calculating unit of the microcomputer is not limited to torque, but may be any physical quantity such as rotation angle, stroke, speed, load, pressure, and the like. Accordingly, the control amount calculated by the control amount calculating unit of the microcomputer using the physical quantity is not limited to the assist amount, but may be appropriately set such as an electric current instruction value, a rotation speed instruction value, and the like.

(f) The digital communication method (protocol) of the communication system is not limited to the SENT method, and other protocols may be adopted. The sensor signal is not limited to a 4-bit nibble signal, but may also be an 8-bit octet signal or the like. Further, the sensor device may transmit the sensor value as an analog signal to the reception unit of the microcomputer.

(g) The communication system of the present disclosure may be applied to any device that calculates a control amount based on detected sensor values, other than an electric power steering device.

The present disclosure is not limited to the above-described embodiments, but various modifications may be made within the scope of the present disclosure without departing from the spirit thereof.

The control device and the relevant technique according to the present disclosure may be realized by a dedicated computer provided by configuring a processor and a memory programmed to execute one or more functions embodied by a computer program. Alternatively, the control device and the relevant technique according to the present disclosure may be realized by a dedicated computer provided by configuring a processor with one or more dedicated hardware logic circuits. Alternatively, the control device and the relevant technique according to the present disclosure may be realized by using one or more dedicated computers configured as a combination of (i) the processor and the memory programmed to execute one or more functions and (ii) the processor with one or more hardware logic circuits. The computer program may be stored in a computer-readable, non-transitory, tangible recording medium as an instruction to be executed by the computer.

The present disclosure has been made in accordance with the embodiments. However, the present disclosure is not limited to such embodiments and configurations. The present disclosure also encompasses various modifications and variations within the scope of equivalents. Furthermore, various combinations and formations, and other combinations and formations including one, more than one or less than one element may be encompassed within the scope and idea of the present disclosure.

What is claimed is:

1. A communication system, comprising:

one or more sensor devices including a plurality of sensor elements each of which detects a sensor value of a physical quantity regarding a same detection target; and one or more microcomputers including:

one or more reception units each of which is disposed corresponding to a respective one of the one or more sensor devices, each of the one or more reception units being configured to receive a signal including the sensor value transmitted from a corresponding one of the plurality of sensor elements of the one or more sensor devices;

a physical quantity computing unit that is configured to calculate the physical quantity based on the sensor values; and a control amount computing unit that is configured to calculate a predetermined control amount based on the calculated physical quantity, wherein each of the one or more reception units includes:

a plurality of signal acquisition units each of which is connected to a respective one of the sensor elements of the sensor devices via a respective one of a plurality of communication channels, each of the signal acquisition units being configured to acquire the sensor value transmitted via the corresponding communication channel when the corresponding communication channel is in a transmittable state; and one transmission trigger signal generation unit that is configured to generate a common transmission trigger signal for simultaneously putting the communication channels in the transmittable state, and the plurality of signal acquisition units in each of the one or more reception units are configured to simultaneously acquire the sensor values by the common transmission trigger signal, wherein each of the signal acquisition units is integrally formed, as a module, with a respective one of a plurality of trigger signal generation units each of which is configured to generate a trigger signal, and one of the modules included in each of the one or more reception units is a representative module having the trigger signal generation unit that serves as the transmission trigger signal generation unit, wherein a remaining module among the modules other than the representative module is a general module, the trigger signal generated by the trigger signal generation unit in the general module serves as an intra-module trigger signal for changing a state of the signal acquisition unit in the general module to a signal receivable state, and the trigger signal generated by the trigger signal generation unit in the representative module serves as both the transmission trigger signal and the intra-module trigger signal.

2. The communication system of claim 1, wherein the one or more microcomputers further include an abnormality determination unit that is configured to determine abnormality in the sensor values transmitted from the plurality of sensor elements.

3. The communication system of claim 2, wherein each of the sensor values acquired by each of the plurality of sensor elements includes a positive characteristic sensor value with linear output characteristics having a positive correlation with an actual physical quantity and (ii) a negative characteristic sensor value with linear output characteristics of a negative correlation with the actual physical quantity, the linear output characteristics of the negative characteristic sensor value having an inclination with an absolute value same as an absolute value of an inclination of the linear output characteristics of the positive characteristic sensor value, and the abnormality determination unit is configured to determine that at least one of the sensor values is abnormal when a sum of the positive characteristic sensor value and the negative characteristic sensor value falls out of a predetermined range.

4. The communication system of claim 2, wherein the one or more sensor devices are a plurality of sensor devices each of which is included in one of a plurality of systems, the one or more microcomputers include a plurality of reception units, as the one or more reception units, each of which is included in one of the plurality of systems with the corresponding sensor device, and when the abnormality determination unit determines that any of the sensor values is abnormal, the one or more microcomputers continue to calculate the physical quantity using only the sensor value detected by the sensor device included in one of the plurality of systems that is determined to be normal.

5. The communication system of claim 1, wherein the one or more sensor devices are a plurality of sensor devices each of which is included in one of a plurality of systems, the one or more microcomputers include a plurality of reception units, as the one or more reception units, each of which is included in one of the plurality of systems with the corresponding sensor device, and the transmission trigger signal generation unit of each of the plurality of reception units included in one of the plurality of systems is configured to generate the transmission trigger signal in synchronization with each other.

6. The communication system of claim 1, wherein the one or more sensor devices are configured to transmit the plurality of sensor values as a SENT signal based on American Society of Automotive Engineers standard SAE-J2716.

7. The communication system of claim 1, wherein the communication system is applied to an electric power steering device of a vehicle, the one or more sensor devices are configured to detect a steering torque of a driver, and the one or more microcomputers are configured to calculate an assist amount output by a motor based on the steering torque detected by the one or more sensor devices.

8. The communication system of claim 1, wherein the common transmission trigger signal is configured to interrupt transmission on each of the communication channels or allow transmission on each of the communication channels between a respective sensor element and a respective signal acquisition unit by putting the communication channels into the transmittable state.

* * * * *